(12) United States Patent
Chiou (10) Patent No.: US 6,843,127 B1
(45) Date of Patent: Jan. 18, 2005

(54) FLEXIBLE VIBRATORY MICRO-ELECTROMECHANICAL DEVICE

(75) Inventor: Jen-Huang Albert Chiou, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 10/630,044

(22) Filed: Jul. 30, 2003

(51) Int. Cl.[7] .................................................. G01P 9/04
(52) U.S. Cl. .................................. 73/504.12; 73/504.14
(58) Field of Search .......................... 73/504.04, 504.12, 73/504.14, 504.15, 504.02

(56) References Cited

U.S. PATENT DOCUMENTS

| | | | |
|---|---|---|---|
| 5,349,855 A | | 9/1994 | Bernstein et al. |
| 5,392,650 A | | 2/1995 | O'Brien et al. |
| 5,780,740 A | * | 7/1998 | Lee et al. ................. 73/504.12 |
| 5,783,973 A | * | 7/1998 | Weinberg et al. ............. 331/35 |
| 5,892,153 A | * | 4/1999 | Weinberg et al. ........ 73/504.16 |
| 5,908,986 A | * | 6/1999 | Mitamura ................ 73/504.12 |
| 5,920,012 A | | 7/1999 | Pinson |
| 6,122,961 A | | 9/2000 | Geen et al. |
| 6,257,059 B1 | | 7/2001 | Weinberg et al. |

OTHER PUBLICATIONS

Yazdi, N. et al. "Micromachined Inertial Sensors," *IEEE*; vol. 86, No. 8, Aug. 1998, pp. 1640–1659.

* cited by examiner

*Primary Examiner*—Helen C. Kwok
(74) *Attorney, Agent, or Firm*—Brian M. Mancini (57) ABSTRACT

There is a sensor element (24) for an electronic sensor device (20). The sensor element (24) may have a substrate (43), a pair of proof masses (34a, 34b), a set of drive beams (44), and at least one base beam (46). The pair of proof masses (34a, 34b) are suspended above the substrate (43) and attached to the substrate (43) at fixed anchor points (50). The set of drive beams (44) are positioned between the proof masses (34a, 34b) and the anchor points (50). Each drive beam (44) has a first longitudinal body portion (62) that extends in a first direction and a first flexible spring member (64) that extends along a second direction. The base beam (46) interconnects the set of drive beams (44) and has a second longitudinal body portion (72) and a second flexible spring member (74). The second longitudinal body portion (72) extends along the second direction and the second flexible spring member (74) extends along the first direction. The first and second flexible spring members (64, 74) may be serpentine in shape, such as folded beam-columns or wrinkle springs.

19 Claims, 10 Drawing Sheets

FLEXIBLE VIBRATORY MICRO-ELECTROMECHANICAL DEVICE

FIELD OF THE INVENTION

This invention in general relates to micro-electromechanical systems (MEMS) in sensors such as gyroscopes and, more particularly, to the use of flexible vibratory members in the devices.

BACKGROUND OF THE INVENTION

Electronic sensor devices manufactured by MEMS technology are playing key roles in many areas. For instance, micro mechanical gyroscopes have enabled several important control systems in transportation and commercial applications. Other microdevices such as pressure sensors, accelerometers, actuators, and resonators fabricated by MEMS technology are also used in many areas.

One type of micro gyroscope contains two movable proof masses. The proof masses are suspended above a substrate by a support structure. The proof masses are vibrated in the same plane (in-plane) at a predetermined frequency by a motor in the gyroscope. The motor may include electrodes that drive the proof masses in the same plane in an oscillatory manner. The oscillation of the proof masses is controlled to a frequency near the resonant frequency of the proof masses.

In addition to a set of proof masses and drive electrodes, the gyroscope also contains sensing electrodes around the proof masses that report signals indicative of the movement of each proof mass. In particular, certain electrodes sense the in-plane movement of the proof masses. Other electrodes sense the out-of-plane movement of the proof masses. With appropriate signal processing and extraction circuitry, an angular rate component can be recovered from the reported signal of the electrodes sensing the out-of-plane movement of the proof masses.

The proof masses and support structure in conventional gyroscopes are extremely thin. The thickness of beams in the support structure is known to be below 10 $\mu$m and the width of the beams below 5 $\mu$m, with very tight process tolerances. There is a need to make the proof masses thicker to improve yield in mass production and a need to relax process tolerances. This is particularly important in low cost gyroscope devices for automobile applications. Making the proof masses thicker, however, generates other problems. For instance, certain frequencies of various vibration modes become undesirable and may become more susceptive to signal noise.

A need exists for improved mechanisms to realign frequencies of different vibration modes of a gyroscope that uses movable proof masses. The mechanism should allow the sensor device to use thicker movable proof masses and support structures, which improves yield in mass production applications. It is, therefore, desirable to provide an improved mechanism in a sensor to overcome most, if not all, of the preceding problems.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described are improved mechanisms and structures in a sensor element of an electronic sensor device that allows for the realignment of relative frequencies at various vibration modes. This allows the sensor device to use thicker movable proof masses, which improves yield in mass production applications and allows process tolerances to be relaxed. To this end, in one embodiment there is a sensor element for a sensor device comprising a substrate, a pair of proof masses, and a set of drive beams. The pair of proof masses is suspended above the substrate and is attached to the substrate at fixed anchor points. The set of drive beams is positioned between the proof masses and the anchor points. The drive beams have a longitudinal body portion that extends along a first direction and a flexible spring member that extends along a second direction. The second direction may be perpendicular to the first direction and the flexible spring members may be serpentine in shape, such as folded beam-columns or wrinkle springs.

The sensor element may further comprise at least one base beam that interconnects the set of drive beams. The base beam may have its own longitudinal body portion that extends along the second direction and a second flexible spring member that extends along the first direction. The flexible spring members of the base beam may also be serpentine in shape, such as folded beam-columns or wrinkle springs. The sensor element may further comprise a first pair of electrode combs that drives the proof masses in a first plane. The sensor element may also comprise a second pair of electrode combs and a pair of out-of-plane electrodes.

The second pair of electrode combs would be capable of sensing the movement of the proof masses in the first plane. The pair of out-of-plane electrodes would be capable of sensing the movement of the proof masses in a second plane where the second plane is different from the first plane.

In another embodiment, there is a sensor element for a sensor device comprising a substrate, a pair of proof masses, a set of drive beams, and at least one base beam. The pair of proof masses are suspended above the substrate and attached to the substrate at fixed anchor points. The set of drive beams are positioned between the proof masses and the anchor points. Each drive beam has a first longitudinal body portion that extends in a first direction and a first flexible spring member that extends along a second direction. The base beam interconnects the set of drive beams and has a second longitudinal body portion and a second flexible spring member. The second longitudinal body portion extends along the second direction and the second flexible spring member extends along the first direction. Here, the first and second flexible spring members may be serpentine in shape, such as folded beam-columns or wrinkle springs.

There is also an electronic sensor that comprises a digital processing unit and a sensor element. The sensor element may comprise a substrate, a pair of proof masses, a set of drive beams, and at least one base beam. The pair of proof masses are suspended above the substrate and attached to the substrate at fixed anchor points. The set of drive beams are positioned between the proof masses and the anchor points. Each drive beam has a first longitudinal body portion that extends in a first direction and a first flexible spring member that extends along a second direction. The base beam interconnects the set of drive beams and has a second longitudinal body portion and a second flexible spring member. The second longitudinal body portion extends along the second direction and the second flexible spring member extends along the first direction.

The sensor element may further comprise a first pair of electrode combs that drives the proof masses in a first plane. The first pair of electrode combs may be configured to receive a signal from the digital processing unit. The sensor element may further comprise a second pair of electrode combs and a pair of out-of-plane electrodes. The second pair of electrode combs may be capable of sensing the movement of the proof masses in the first plane and then sending a signal to the digital processing unit. The pair of out-of-plane electrodes may be capable of sensing the movement of the proof masses in another plane and then sending another signal to the digital processing unit. The signals that are reported to the digital processing unit may be used by the device to extract an angular rate component reflective of the angular rate externally induced to the device.

Figure 1:
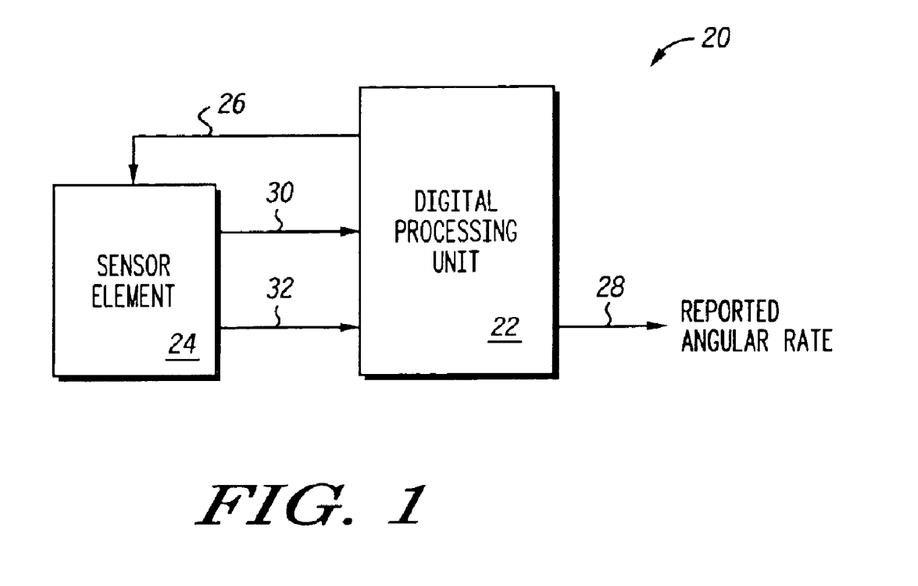
FIG. 1 is a high-level block diagram of one embodiment of an electronic sensor of the present invention.

Now, turning to the drawings, FIG. 1 illustrates one embodiment of an electronic sensor 20 having a digital processing unit 22 and a sensor element 24. To illustrate the present invention, a micro gyroscope sensor will be used as an exemplary embodiment of the electronic sensor 20.

In one embodiment, the digital processing unit 22 may be implemented in a digital signal processor (DSP) controller that includes a number of functional blocks such as those described in a patent application entitled Method and Apparatus for Signal Extraction in an Electronic Sensor by Stephen J. Rober, filed Oct. 18, 2003, Ser. No. 10/273,805, commonly assigned to the assignee of the present application and incorporated herein by reference in its entirety. Generally, in one embodiment, the digital processing unit 22 may control the movement of proof masses of the sensor element 24 in one plane by sending a motor drive signal 26 to the sensor element 24. Alternatively, a separate analog system could be used to control the movement of the proof masses of the sensor element 24 as known to those of ordinary skill in the art. The digital processing unit 22 may also extract and report an angular rate 28 that is reflective of the angular rate that is externally induced to the sensor element 24. To extract and report the angular rate 28, the present invention uses the digital processing unit 22 to receive a first signal 30 and a second signal 32 from the sensor element 24. As will be described further below, the first signal 30 is reported from sensing electrodes that are in the same plane as the proof masses. The second signal 32 is reported from sensing electrodes that are not in the same plane as the proof masses.

Figure 2:
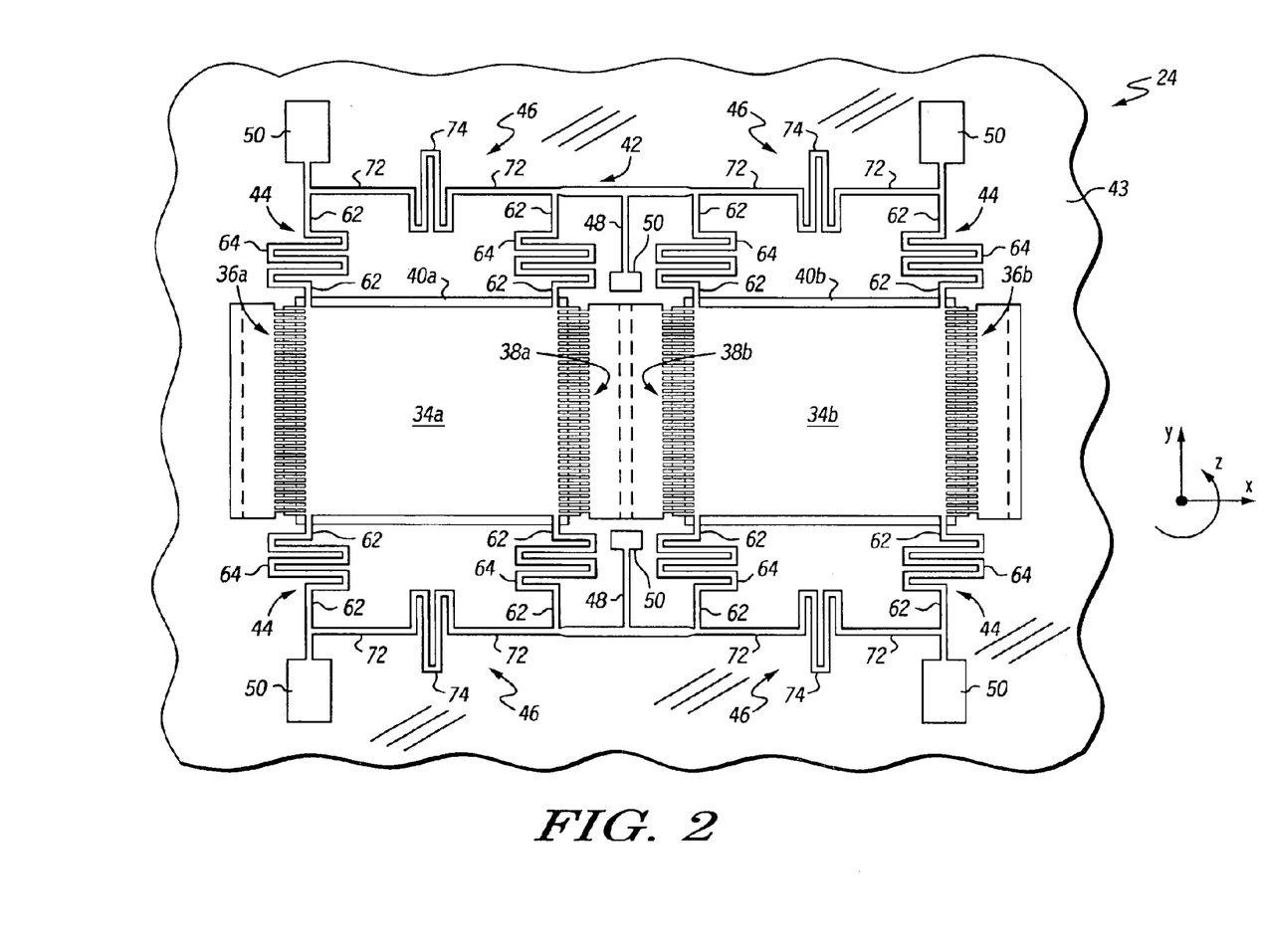
FIG. 2 is a top view of one embodiment of a sensor element of the present invention.

Referring to FIG. 2, the sensor element 24 generally includes a pair of movable proof masses 34a, 34b, a pair of outer combs 36a, 36b, a pair of inner combs 38a, 38b, a pair of out-of-plane sensing electrodes 40a, 40b, and a support structure 42. The support structure 42 is attached between the movable proof masses and an underlying substrate 43. In one embodiment, the underlying substrate 43 is made of glass and the proof masses 34a, 34b and support structure 42 are made of silicon.

In one embodiment of the present invention, as shown in FIG. 2, the support structure 42 comprises a series of drive beams 44, base beams 46, and torsion beams 48. The components of the sensor element 24 are mounted to the substrate 43, via the support structure 42, at fixed anchor points 50. The components of the sensor element 24 are preferably housed within a vacuum-sealed cavity.

The proof masses 34a, 34b are suspended above the substrate 43. As described in more detail below, the beams 44, 46, 48 of the support structure 43 permit the proof masses 34a, 34b to move in relation to a series of anchor points 50. The anchor points 50 are rigidly attached to the substrate 43. The proof masses 34a, 34b are permitted to move in different planes. The first plane (in-plane) is defined by an x-axis as shown in FIG. 2. The other planes (out-of-planes) are defined by a y-axis and a z-axis.

Figure 3A:
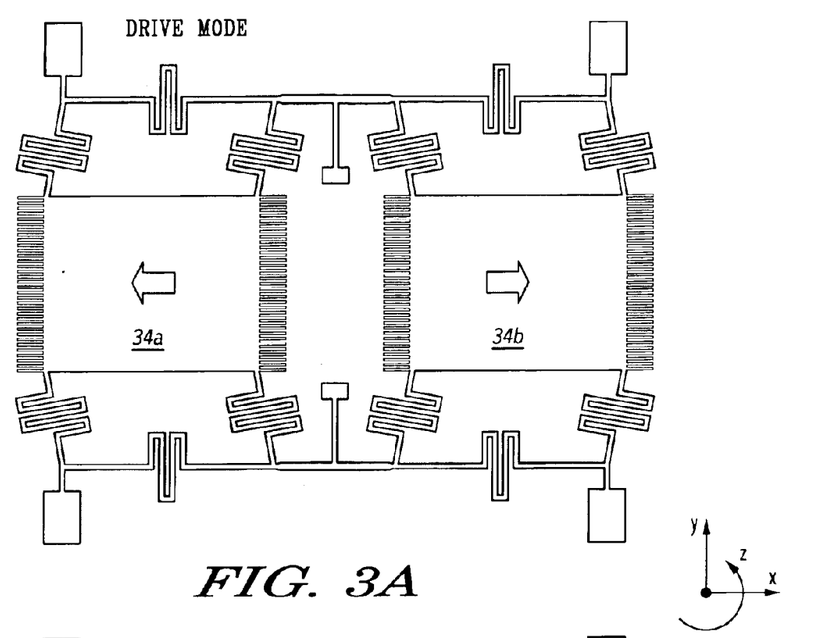
FIGS. 3A-3B is a top view of one embodiment of the present invention where a set of proof masses in the sensor element are moving in a drive mode (proof masses moving in opposite direction in the x-axis)
Figure 3B:
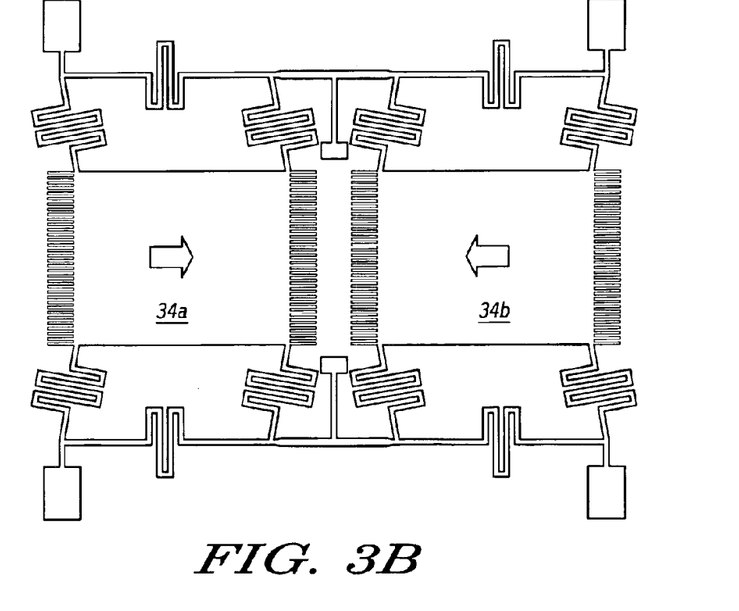

The pair of outer combs 36a, 36b are electrodes that drive the proof masses 34a, 34b in the first plane defined by the x-axis. An exaggerated view of this movement (drive mode) is shown in FIGS. 3A and 3B. In the drive mode, the motion is driven by the electrodes to create Coriolis forces on the proof masses 34a, 34b. The pair of outer combs 36a, 36b may be mounted to the substrate and provide electrostatic forces with varying input voltages to drive the proof masses.

The pair of inner combs 38a, 38b are in the same plane as the proof masses 34a, 34b. The pair of inner combs 38a, 38b may be mounted to the substrate. The pair of inner combs 38a, 38b may be electrodes that sense the movement of the proof masses 34a, 34b in the x-axis. The pair of inner combs 38a, 38b are used to report the first signal 30 to the digital processing unit 22.

Figures 4A, 4B:
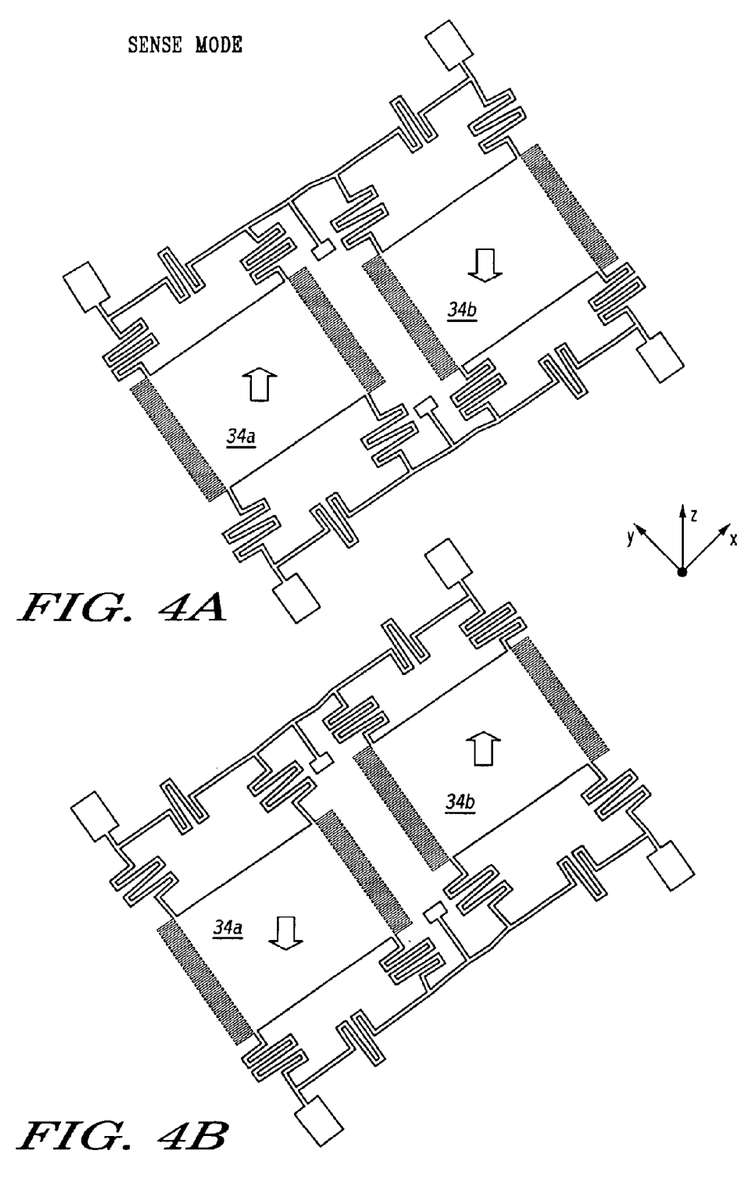
FIGS. 4A-4B is a perspective view of one embodiment of the present invention where a set of proof masses in the sensor element are moving in a sense mode (proof masses moving in opposite direction in the z-axis)

The pair of out-of-plane sensing electrodes 40a, 40b sense the out-of-plane movement of the proof masses 34a, 34b. For instance, an exaggerated view of one of the main types of out-of-plane movements (sense mode) is shown in FIGS. 4A and 4B. This is when the proof masses 34a, 34b move opposite to each other in a z-axis direction. The pair of out-of-plane sensing electrodes 40a, 40b may be positioned beneath the pair of proof masses 34a, 34b. The pair of out-of-plane sensing electrodes 40a, 40b are used to report the second signal 32 to the digital processing unit 22. The second signal 32 contains an angular rate component that reflects the angular rate externally induced to the sensor element 24. The digital processing unit 22 receives the second signal 32 and extracts the angular rate component to report the angular rate 28.

As mentioned above, FIGS. 3A, 3B, 4A, 4B show exaggerated views of the oscillatory movement of the proof masses 34a, 34b for a drive mode (FIGS. 3A and 3B) and a sense mode (FIGS. 4A and 4B). The frequency at which the proof masses 34a, 34b oscillate need to be near each other to avoid other vibration modes and signal noise. Currently, it has been known to use very thin proof masses and support structures, with very limited process thickness ranges, to keep the frequencies of these two modes near each other. The use of thin structures and limited process tolerances generates lower yields in the manufacturing process. It would be advantageous to use proof masses that are thicker to improve yield in mass production and to relax process tolerances.

The use of thicker proof masses, however, creates other problems. For instance, the frequencies of oscillation in the drive mode (shown FIGS. 3A and 3B) and a sense mode (shown in FIGS. 4A and 4B) will become too far apart from each other. Moreover, other undesired vibration modes such as the ones described below may result. Without the mechanisms described in this invention, these other vibration modes may separate the frequencies of the drive mode and sense mode and the device will not function correctly.

Figure 5A:
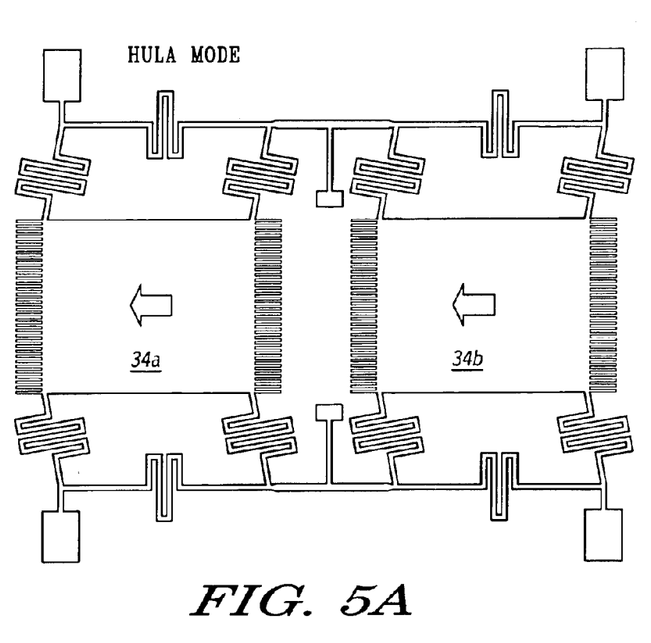
FIGS. 5A-5B is a top view of one embodiment of the present invention where a set of proof masses in the sensor element are moving in a hula mode (proof masses moving together in the x-axis direction)
Figure 5B:
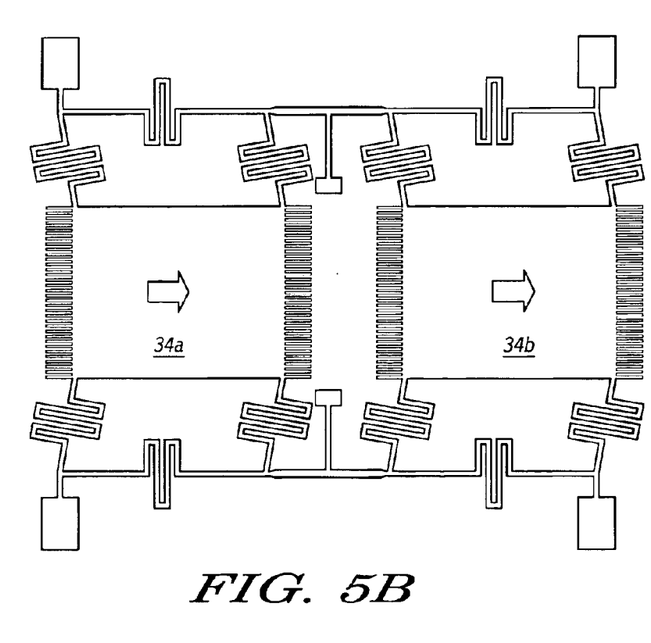
Figure 6A:
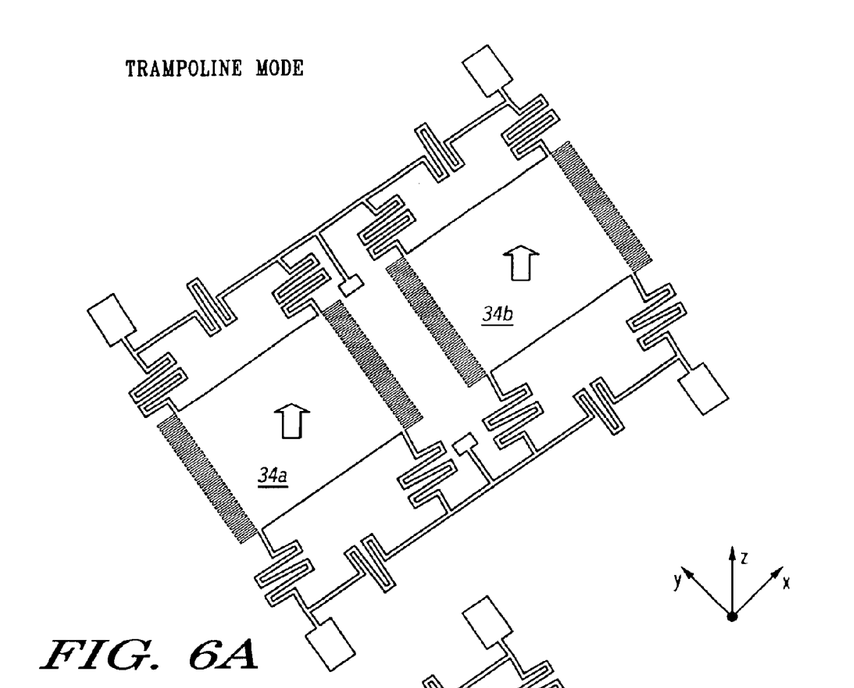
FIGS. 6A-6B is a perspective view of one embodiment of the present invention where a set of proof masses in the sensor element are moving in a trampoline mode (proof masses moving together in the z-axis direction)
Figure 6B:
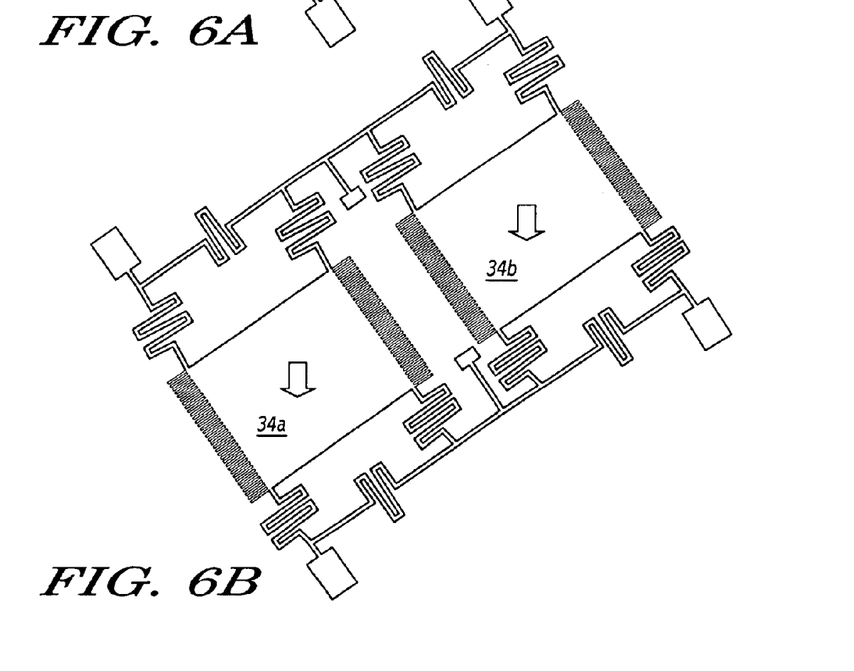
Figures 7A, 7B:
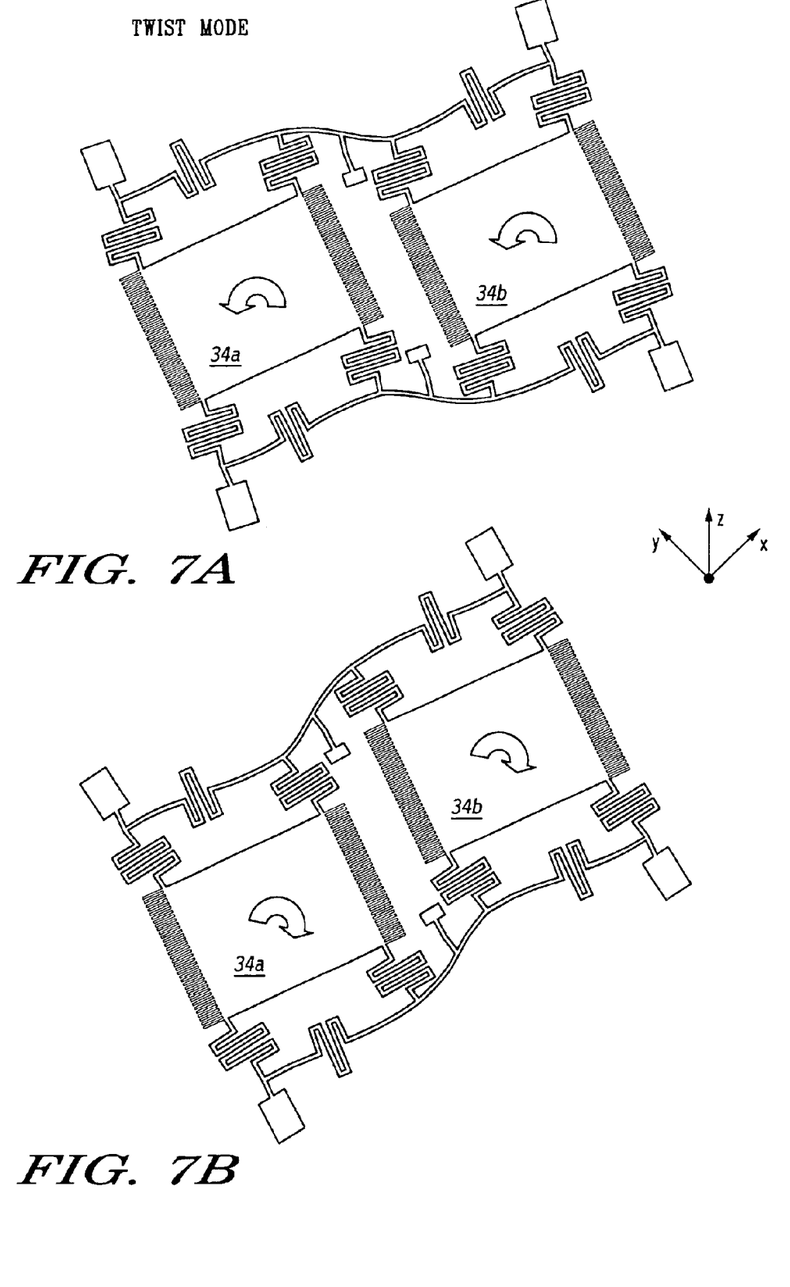
FIGS. 7A-7B is a perspective view of one embodiment of the present invention where a set of proof masses in the sensor element are moving in a twist mode (proof masses twisting in the y-axis plane)
Figures 8A, 8B:
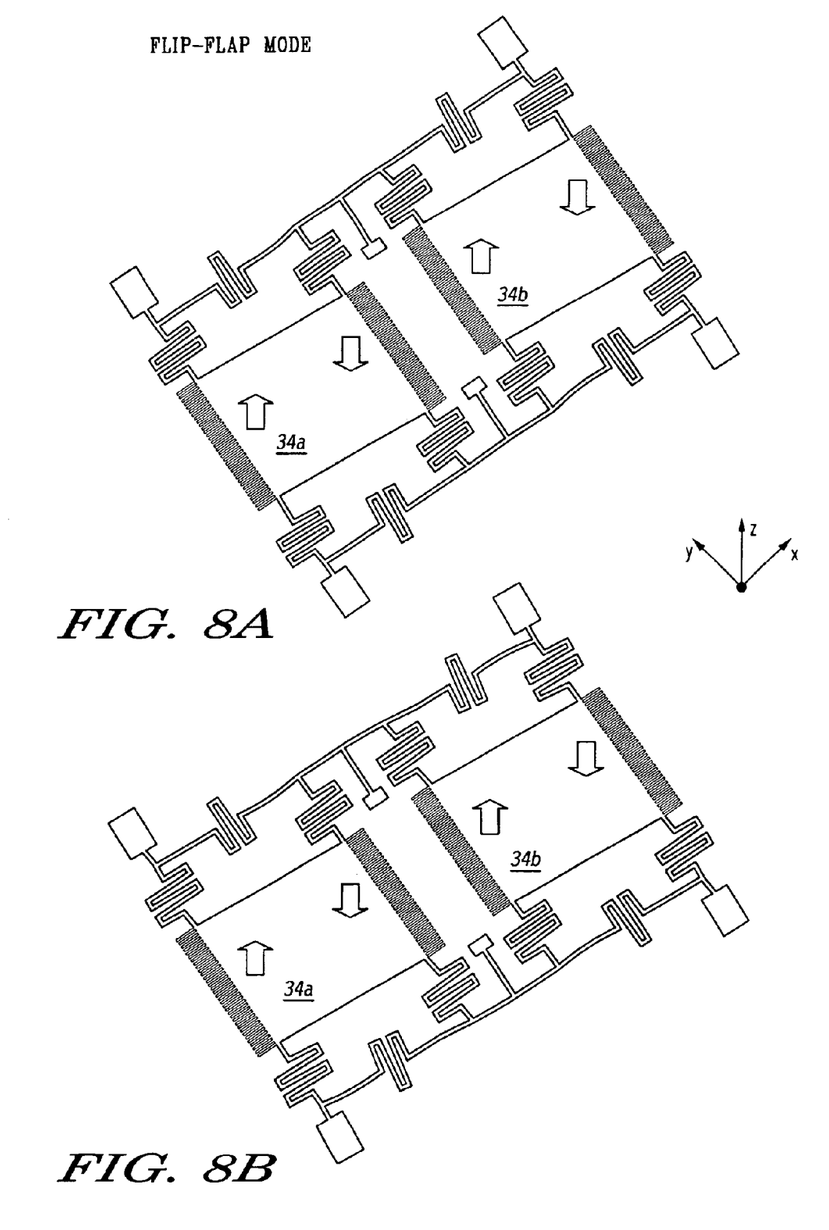
FIGS. 8A-8B is a perspective view of one embodiment of the present invention where a set of proof masses in the sensor element are moving in a flip-flap mode (proof masses twisting about the y-axis)

For instance, one vibration mode that may occur, when thicker structures are used, is a vibration mode that we will call the hula mode. An exaggerated view of the movement of the proof masses 34a, 34b in the hula mode is shown in FIGS. 5A and 5B. Here, the proof masses 34a, 34b may move in the same direction in the x-axis direction. Another vibration mode that can occur is what we will call the trampoline mode. An exaggerated view of the movement of the proof masses 34a, 34b in the trampoline mode is shown in FIGS. 6A and 6B. Here, the proof masses 34a, 34b may move together in the z-axis direction. A further vibration mode that can occur is what we will call the twist mode. An exaggerated view of the movement of the proof masses 34a, 34b in the twist mode is shown in FIGS. 7A and 7B. Here, the proof masses 34a, 34b may twist in the y-axis plane and rotate about the z-axis. Yet another vibration mode that can occur is what we will call the flip-flap mode. An exaggerated view of the movement of the proof masses 34a, 34b in the flip-flap mode is shown in FIGS. 8A and 8B. Here, the proof masses 34a, 34b may rotate about the y-axis.

To allow thicker structures for the sensing element 24, the present invention advantageously includes a mechanism as described below. In particular, the support structure 42 has a set of drive beams 44 that are positioned between the proof masses 34a, 34b and the anchor points 50. Each drive beam 44 has a longitudinal body portion 62 that extends along a first direction and a flexible spring member 64 that extends along a second direction. In the embodiment shown in FIGS. 3–8, the first direction is along the y-axis and the second direction is along the x-axis. One skilled in the art with the benefit of this disclosure will realize that the actual definition of the axes is implementation specific. However, the first direction should be different from the second direction. The embodiment shown in FIGS. 3–8 shows the second direction perpendicular to the first direction. Moreover, in one embodiment, the flexible spring members 64 are formed in a serpentine shape, or folded beam-columns or wrinkle springs, and uniform along a portion of the longitudinal body portion 62.

Figure 9:
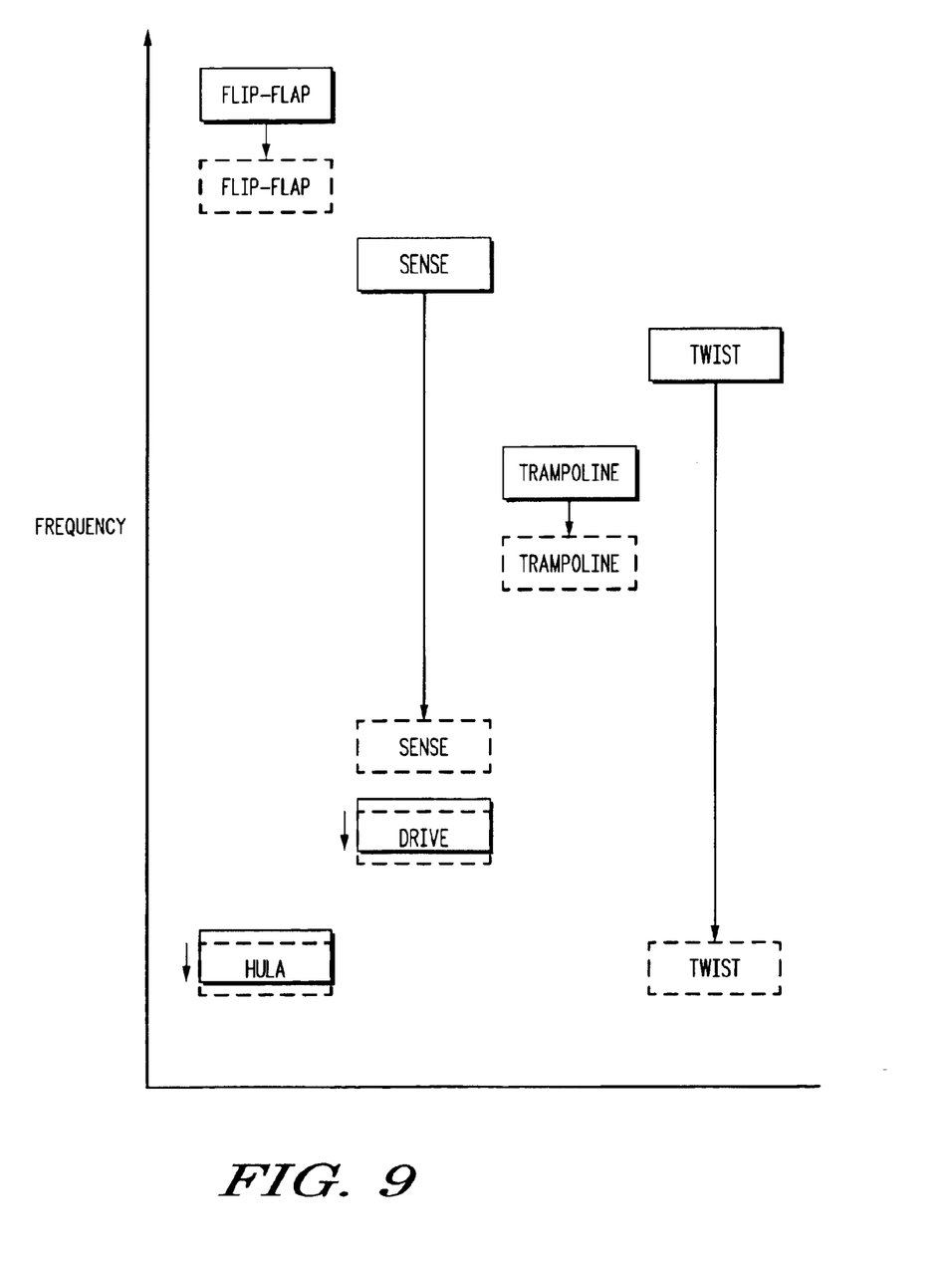
FIGS. 9 and 10 are diagrams illustrating relative frequencies that may be obtained by using various embodiments of the present invention.

Using thicker proof masses than found in conventional devices, FIG. 9 shows the relative frequencies of the various vibration modes for one embodiment of the present invention. The dashed boxes show the relative frequencies of the various vibration modes using the flexible spring members 64 on the drive beams 44. The solid line boxes reflect the relative frequencies of the various vibration modes without the flexible spring members 64. It is noted that the use of the flexible spring member 64 on the drive beams 44 will allow the relative frequencies of the drive mode and the sense mode to be more closely aligned. Moreover, in a further embodiment, the base beam 46 of the support structure 42 is used to interconnect the drive beams 44. The base beams 46 have a longitudinal body portion 72 that extends along the second direction and a flexible spring member 74 that extends along the first direction. As mentioned above, the second direction is along the x-axis and the first direction is along the y-axis. Again, one skilled in the art with the benefit of this disclosure will realize that the actual definition of the axes is implementation specific. However, the first direction should be different from the second direction. The embodiment shown in FIGS. 3–8 shows the second direction perpendicular to the first direction. In this embodiment, the flexible spring members 74 are formed in a serpentine shape, or folded beam-columns or wrinkle springs, and uniform along a portion of the longitudinal body portion 72.

Figure 10:
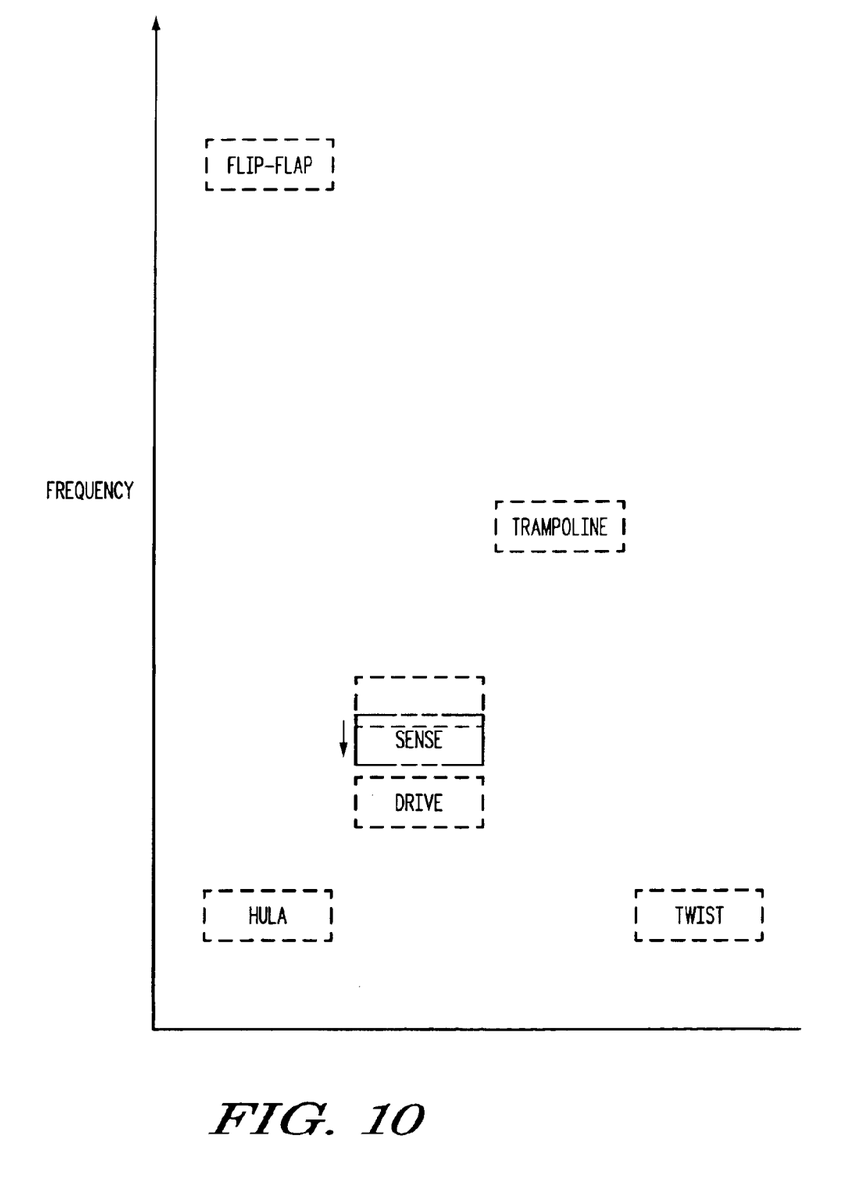

Using thicker proof masses than found in conventional devices, FIG. 10 shows the relative frequencies of the various vibration modes for an embodiment that uses both the flexible spring members 64 in the drive beams 44 and the flexible spring members 74 in the base beams 46. In particular, the dotted-dashed boxes show the relative frequencies of the various vibration modes using both flexible spring members 64, 74. In effect, the use of the flexible spring members 74 will shift the frequency of the sense mode closer to the frequency of the drive mode. The dashed line boxes reflect the relative frequencies of the various vibration modes with just the flexible spring members 64 in the drive beams 44. It is noted that with the flexible spring members 64, 74 provide a further improvement to existing devices and allow the relative frequencies of the drive mode and the sense mode to be more closely aligned.

What has been described are improved mechanisms and structures in a sensor element that allow for the realignment of frequencies at various vibration modes. This allows the sensor device to use thicker movable proof masses and structures, which improves yield in mass production applications and allows process tolerances to be relaxed. As a result, the present invention has the benefit of reducing manufacturing costs for a sensor device. The mechanism and structure allows more flexibility by using serpentine, or folded beam-columns or wrinkle springs, to more closely align the frequencies for the drive mode and the sense mode without interference by other unwanted vibration modes. The mechanism allows flexibility to a designer by allowing the number of serpentine loops, the width of loops, and the gap between loops to be adjusted to fine-tune the stiffness and adjust the overall frequencies of the structure.

The above description of the present invention is intended to be exemplary only and is not intended to limit the scope of any patent issuing from this application. The present invention is intended to be limited only by the scope and spirit of the following claims.

What is claimed is:

1. A sensor element for a sensor device, the sensor element comprising:
   a substrate;
   a pair of proof masses that are attached to the substrate at fixed anchor points, the pair of proof masses suspended above the substrate; and a set of drive beams positioned between the proof masses and the anchor points, the drive beams having a first body portion that includes a first flexible spring member that extends along a first direction and a second body portion that includes a flexible spring member that extends along a second direction, the second direction being perpendicular to the first direction the first and second flexible members being configured such that a drive frequency and a sense frequency of the proof masses are substantially aligned.

2. The sensor element of claim 1 further comprising at least one base beam that interconnects the set of drive beams the base beam having a first longitudinal body portion, that includes a first flexible spring member that extends along the second direction and a second body portion that includes a second flexible spring member that extends along the first direction.

3. The sensor element of claim 1, wherein the flexible spring members are serpentine in shape.

4. The sensor element of claim 1, wherein the substrate is made of glass and the proof masses and drive beams are made of silicon.

5. The sensor element of claim 1, wherein the sensor element is used in sensing an externally induced angular rate in a gyroscope.

6. The sensor element of claim 1 further comprising a first pair of electrode combs that drives the proof masses in a first direction of a first plane at the drive frequency.

7. The sensor element of claim 6 further comprising a second pair of electrode combs and a pair of out-of-plane electrodes, the second pair of electrode combs capable of sensing the movement of the proof masses in the first plane, the pair of out-of-plane electrodes capable of sensing the movement at the sense frequency of the proof masses in a second plane, the second plane being different from the first plane.

8. A sensor element for a sensor device, the sensor element comprising:
a substrate;
a pair of proof masses that are attached to the substrate at fixed anchor points, the pair of proof masses suspended above the substrate; and
a set of drive beams positioned between the proof masses and the anchor points, each drive beam having a first body portion that extends along a first direction in a plane and a first flexible spring member therein and a second body portion that includes a second flexible spring member that extends along a second direction, the second direction in the plane being perpendicular to the fist direction, the first and second flexible spring members being configured such that a drive frequency of the proof masses in the first direction of the plane and a sense frequency of the proof masses out of the plane are substantially aligned and not aligned with at least one vibrational frequency that is in the second direction in the plane.

9. The sensor element of claim 8, wherein the flexible spring members of the drive beams are serpentine in shape.

10. The sensor element of claim 8, wherein the substrate is made of glass and the proof masses, and drive beams are made of silicon.

11. The sensor element of claim 8, wherein the sensor element is used in sensing an externally induced angular rate in a gyroscope.

12. The sensor element of claim 8 further comprising a first pair of electrode combs that drives the proof masses in a first direction of a first plane at the drive frequency.

13. The sensor element of claim 12 further comprising a second pair of electrode combs and a pair of out-of-plane electrodes, the second pair of electrode combs capable of sensing the movement of the proof masses in the first plane, the pair of out-of-plane electrodes capable of sensing the movement at the sense frequency of the proof masses in a second plane, the second plane being different from the first plane.

14. An electronic sensor comprising:
a digital processing unit; and
a sensor element, the sensor element comprising:
a substrate;
a pair of proof masses that are attached to the substrate at fixed anchor points, the pair of proof masses suspended above the substrate;
a set of drive beams positioned between the proof masses and the anchor points, each drive beam having a first longitudinal body portion that extends along a first direction in a plane and a first flexible spring member therein and a second body portion that includes a second flexible spring member that extends along a second direction in the plane, the second direction being perpendicular to the first direction, the first and second flexible spring members being configured such that a drive frequency of the proof masses in the first direction of the plane and a sense frequency of the proof masses out of the plane are substantially aligned and not aligned with at least one vibrational frequency that is in the second direction in the plane; and
at least one base beam that interconnects the set of drive beams, the base beam having a second longitudinal body portion that includes a first flexible spring member that extends along the second direction and a second body portion includes a second flexible spring member that extends along the first direction.

15. The electronic sensor of claim 14, wherein the flexible spring members of the drive beams are serpentine in shape.

16. The electronic sensor of claim 14, wherein the substrate is made of glass and the proof masses, drive beams, and base beam are made of silicon.

17. The electronic sensor of claim 14, wherein the sensor element is used in sensing an externally induced angular rate in a gyroscope.

18. The electronic sensor of claim 14, wherein the sensor element further comprises a first pair of electrode combs that drives the proof masses in a first direction of a first plane at the drive frequency, the first pair of electrode combs receiving a signal from the digital processing unit.

19. The electronic sensor of claim 18, wherein the sensor element further comprises a second pair of electrode combs and a pair of out-of-plane electrodes, the second pair of electrode combs capable of sensing the movement of the proof masses in the first plane, the pair of out-of-plane electrodes capable of sensing the movement at the sense frequency of the proof masses in a second plane, the second plane being different from the first plane, the second pair of electrode combs and the pair of out-of-plane electrodes further capable of sending signals to the digital processing unit.

* * * * *